United States Patent
Sanchez et al.

(10) Patent No.: US 10,755,724 B2
(45) Date of Patent: Aug. 25, 2020

(54) SYSTEMS AND METHODS FOR ADJUSTING DUBBED SPEECH BASED ON CONTEXT OF A SCENE

(71) Applicant: Rovi Guides, Inc., San Jose, CA (US)

(72) Inventors: Mario Sanchez, San Jose, CA (US);
Ashleigh Miller, Denver, CO (US);
Paul T. Stathacopoulos, San Carlos, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/610,225

(22) PCT Filed: May 4, 2017

(86) PCT No.: PCT/US2017/030971
§ 371 (c)(1),
(2) Date: Nov. 1, 2019

(87) PCT Pub. No.: WO2018/203901
PCT Pub. Date: Nov. 8, 2018

(65) Prior Publication Data
US 2020/0066293 A1 Feb. 27, 2020

(51) Int. Cl.
*H04N 5/93* (2006.01)
*G10L 21/02* (2013.01)
(Continued)

(52) U.S. Cl.
CPC ...... *G10L 21/0202* (2013.01); *G06K 9/00302* (2013.01); *G10L 15/1815* (2013.01);
(Continued)

(58) Field of Classification Search
CPC .......... G06K 9/00302; G06K 9/00711; G06K 9/00765; G10L 13/033; G10L 15/1815;
(Continued)

(56) References Cited

U.S. PATENT DOCUMENTS 6,239,794 B1   5/2001   Yuen et al.
6,564,378 B1   5/2003   Satterfield et al.
(Continued)

OTHER PUBLICATIONS

ISR and Written Opinion in PCT/US2017/030971 dated Dec. 14, 2017.

*Primary Examiner* — Robert Chevalier
(74) *Attorney, Agent, or Firm* — Haley Guiliano LLP

(57) ABSTRACT

Systems and methods are disclosed herein for detecting dubbed speech in a media asset and receiving metadata corresponding to the media asset. The systems and methods may determine a plurality of scenes in the media asset based on the metadata, retrieve a portion of the dubbed speech corresponding to the first scene, and process the retrieved portion of the dubbed speech corresponding to the first scene to identify a speech characteristic of a character featured in the first scene. Further, the systems and methods may determine whether the speech characteristic of the character featured in the first scene matches the context of the first scene, and if the match fails, perform a function to adjust the portion of the Dubbed Speech of the dubbed speech so that the speech characteristic of the character featured in the first scene matches the context of the first scene.

21 Claims, 8 Drawing Sheets

(51) Int. Cl.
    *G06K 9/00*     (2006.01)
    *G10L 15/18*     (2013.01)
    *G10L 15/22*     (2006.01)
    *G10L 25/51*     (2013.01)
    *H04N 9/802*     (2006.01)

(52) U.S. Cl.
    CPC .............. *G10L 15/22* (2013.01); *G10L 25/51* (2013.01); *H04N 9/802* (2013.01)

(58) Field of Classification Search
    CPC ..... G10L 15/22; G10L 21/00; G10L 21/0202; G10L 25/51; H04N 9/802; H04N 21/435; G11B 27/28; G06F 16/7834
    USPC ........ 386/285, 278, 280, 279, 323, 324, 326
    See application file for complete search history.

(56) References Cited

U.S. PATENT DOCUMENTS

| | | | |
|---|---|---|---|
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,970,720 B2 * | 3/2015 | Razavi | H04N 5/23241 348/222.1 |
| 2002/0097380 A1 | 7/2002 | Moulton et al. | |
| 2002/0174430 A1 | 11/2002 | Ellis et al. | |
| 2005/0251827 A1 | 11/2005 | Ellis et al. | |
| 2008/0097970 A1 * | 4/2008 | Olstad | G06F 16/738 |
| 2009/0299748 A1 | 12/2009 | Basson et al. | |
| 2010/0153885 A1 | 6/2010 | Yates | |
| 2016/0021334 A1 | 1/2016 | Rossano et al. | |

\* cited by examiner

SYSTEMS AND METHODS FOR ADJUSTING DUBBED SPEECH BASED ON CONTEXT OF A SCENE

CROSS-REFERENCE TO RELATED APPLICATIONS

This application is a national stage application under 35 U.S.C. § 371 of International Application PCT/US2017/030971 filed May 4, 2017. The disclosure of which is hereby incorporated by reference herein in its entirety.

BACKGROUND

In related art systems, the sound of a speaker's voice in dubbed speech is typically adjusted to sound like an actor speaking in the media asset based purely on the original speech of the actor in the media asset. To do this, typical systems generate a voice profile for the original speech that includes information regarding pitch, temporal structure and other qualities of the original speech. The generated voice profile is used to modify the dubbed speech to sound like the original actor, who produced the original speech. These typical systems, though, fail to consider context for the actor's speech in making the adjustments, which results in undesirable audio for the media asset that sounds unnatural.

SUMMARY

Systems and methods are provided herein for adjusting dubbed speech based on context of a scene. The media guidance application may determine that a media asset contains dubbed speech and decompose the media asset into scenes, according to the media asset's metadata. Further, the media guidance application may determine the type of the scene, e.g., an action scene, a love scene, etc., using the metadata of the scene and check if the intonation of the actor's dubbed speech is consistent with the type of the scene. Finally, the media guidance application may modify the dubbed speech to make the intonation and the type of the scene consistent. For example, the media guidance application may detect a dubbed speech corresponding to the actor Sylvester Stallone in the Japanese dubbed movie "Driven." The media guidance application may split the movie into a set of scenes and determine that the first scene is a car chase. Further, for example, the media guidance application may determine that the dubbed speech in Japanese sounds calm where it is expected that Sylvester Stallone should sound alarmed in a car chase scene. Even further, for example, the media guidance application may adjust the Japanese dubbed speech so that Sylvester Stallone sounds alarmed in the car chase scene.

In some aspects, the media guidance application may detect dubbed speech in a media asset. For example, the media guidance application may detect dubbed speech in the Japanese dubbed movie "Driven." In some embodiments, the media guidance application may in response to detecting the dubbed speech in the media asset, receive metadata corresponding to the media asset. For example, the media guidance application may, in response to detecting dubbed speech in the Japanese dubbed movie "Driven," receive the metadata of the Japanese dubbed movie "Driven."

In some embodiments, after receiving the metadata, the media guidance application may determine a plurality of scenes in the media asset based on the metadata. For example, the media guidance application may determine that the Japanese dubbed movie "Driven" has one hundred scenes, based on the received metadata. In some embodiments, after determining the scenes, the media guidance application may receive metadata corresponding to a first scene from the plurality of scenes. For example, the media guidance application may receive the metadata corresponding to the first scene of the Japanese dubbed movie "Driven."

Further, in some embodiments, after receiving the first scene metadata, the media guidance application may determine context of the first scene based on the metadata corresponding to the first scene. For example, the media guidance application may determine that the first scene is a car chase scene and thus an action scene. In some embodiments, after determining the context of the first scene, the media guidance application may retrieve a context speech characteristic for the context of the first scene. For example, the media guidance application may determine from a look-up table the speech characteristic should sound alarmed for a scene that is an action scene.

In some embodiments, additionally to retrieving the context speech characteristic, the media guidance application may retrieve a portion of the dubbed speech corresponding to the first scene. For example, the media guidance application may retrieve the dialog that occurs during the first scene of the Japanese dubbed movie "Driven." Further, in some embodiments, the media guidance application may retrieve a set of speech templates corresponding to a character featured in the first scene, wherein each speech template from the set of speech templates corresponds to a different speech characteristic of the character featured in the first scene. For example, the media guidance application may retrieve, from a database, speech templates for Stallone for when he sounds angry, calm, gentle, loving, alarmed, scared, comic, confused, excited, doubtful, urgent, and accusing.

In some embodiments, after retrieving the set of speech templates, the media guidance application may compare the retrieved portion of the dubbed speech corresponding to the first scene to each speech template from the set of speech templates corresponding to the character featured in the first scene to identify a speech template that corresponds to the retrieved portion. For example, the media guidance application may compare the dialog in the first scene of the Japanese dubbed movie "Driven" to each of the templates in which Stallone sounds angry, calm, gentle, loving, alarmed, scared, comic, confused, excited, doubtful, urgent, and accusing and identify that Stallone sounds gentle in the first scene of the Japanese dubbed movie "Driven." In some embodiments, after identifying the speech template, the media guidance application may identify a speech characteristic associated with the identified speech template. For example, the media guidance application may identify that the template in which Stallone sounds gentle corresponds to the speech characteristic "gentle."

In some embodiments, after identifying the speech characteristic and retrieving the context speech characteristic, the media guidance application may determine whether the identified speech characteristic of the character featured in the first scene matches the context speech characteristic for the context of the first scene. For example, the media guidance application may determine that Stallone is supposed to sound alarmed in the first scene but he actually sounds gentle. Finally, in some embodiments, the media guidance application may, in response to determining that the speech characteristic of the character featured in the first scene fails to match the context speech characteristic for the context of the first scene, perform a function to adjust the portion of the dubbed speech so that the speech characteristic of the character featured in the first scene match the context speech characteristic for the context of the first scene. For example, the media guidance application may adjust Stallone's speech in the first scene so that he sounds alarmed instead of gentle.

In order to detect the dubbed speech in the media asset, in some embodiments, the media guidance application may retrieve video information corresponding to the media asset. For example, the media guidance application may retrieve the video files corresponding to the Japanese dubbed movie "Driven." The media guidance application may retrieve the video information from a local storage, a remote database, or any other type of digital or analog storage. In some embodiments, additionally, the media guidance application may retrieve audio information corresponding to the media asset. For example, the media guidance application may retrieve the audio files corresponding to the Japanese dubbed movie "Driven." The media guidance application may retrieve the audio information from a local storage, a remote database, or any other type of digital or analog storage.

In some embodiments, in order to detect the dubbed speech, once the audio information is retrieved, the media guidance application may retrieve speech information of the character corresponding to the audio information. For example, the media guidance application may retrieve the part of the audio files that corresponds to Sylvester Stallone. The media guidance application may analyze the retrieved audio information and determine which sounds correspond to the character speaking. The media guidance application may achieve this by using voice recognition techniques or by using the metadata associated with the audio information. In some embodiments, once the video information is retrieved, the media guidance application may retrieve facial movements of the character corresponding to the video information. For example, the media guidance application may retrieve Stallone's facial movements from the video files. The media guidance application may analyze the retrieved video information and identify the character's face using face recognition techniques, in order to isolate the character's facial movements.

In some embodiments, in order to detect the dubbed speech, after retrieving the speech information and the facial movements, the media guidance application may determine whether the facial movements of the character correspond to the speech information. For example, the media guidance application may determine if what Stallone is saying corresponds to his facial movements. The media guidance application may use computer algorithms to generate expected facial movements corresponding to the speech information and then compare the expected facial movements to the facial movements. In some embodiments, the media guidance application may, in response to determining that the facial movements of the character do not correspond to the speech information, detect the dubbed speech in the media asset. For example, if what Stallone is saying does not correspond to his facial movements, the media guidance application may determine that the speech is dubbed.

In order to determine the context of the first scene, in some embodiments, the media guidance application may retrieve a plurality of keywords corresponding to the metadata corresponding to the first scene. For example, the media guidance application may retrieve the keywords "car," "chase," "danger," and "shooting" from the metadata of the first scene. In some embodiments, after receiving the plurality of keywords, the media guidance application may determine the context of the first scene based on a subset of the plurality of the keywords corresponding to the metadata corresponding to the first scene. For example, the media guidance application may determine, based on the retrieved keywords "car," "chase," and "shooting," that the scene is an action scene. The media guidance application may retrieve a look-up table containing a list of keywords corresponding to each context of the scene. The media guidance application may retrieve the look-up table from a local or remote database, or any other digital or analog storage.

In order to retrieve the context speech characteristic in some embodiments, the media guidance application may retrieve a personality metadata corresponding to the character, wherein the personality metadata includes expected speech characteristic for each context for the character. For example, the media guidance application may retrieve the personality metadata for Stallone and determine that Stallone is expected to be alarmed in an action scene and calm in a relaxing scene. The media guidance application may attempt to determine dubbed speech for each of the characters, for the main character, or for any character at random. The media guidance application may retrieve the personality metadata from a local or remote database, or any other digital or analog storage. In some embodiments, after retrieving the personality metadata, the media guidance application may identify the context speech characteristic as the expected speech characteristic for the context of the first scene based on the personality metadata corresponding to the character. For example, the media guidance application may determine that Stallone is supposed to sound alarmed in the first scene, since it is an action scene. The media guidance application may find the context of the first scene in the personality metadata and retrieve the expected speech characteristic for the character.

In order to retrieve the set of speech templates, in some embodiments, the media guidance application may retrieve the language of the dubbed speech corresponding to the media asset. For example, the media guidance application may retrieve from a database or the metadata of the Japanese dubbed movie "Driven" that this movie is in Japanese. The media guidance application may retrieve the language from the metadata of the media asset or from a local or remote database, or any other digital or analog storage. In some embodiments, after retrieving the language of the dubbed speech, the media guidance application may retrieve the set of speech templates corresponding to the character featured in the first scene and corresponding to the language of the dubbed speech. For example, the media guidance application may retrieve from a database speech templates for Stallone in Japanese for when he sounds angry, calm, gentle, loving, alarmed, scared, comic, confused, excited, doubtful, urgent, and accusing. The media guidance application may retrieve a look-up table from a local or remote database, or any other digital or analog storage, including a set of templates for each language. The media guidance application may then find the entry corresponding to the retrieved language in the look-up table, and retrieve the set of speech templates for that language.

An alternative method for retrieving the set of speech templates corresponding to the character featured in the first scene is described below. In such embodiments, the media guidance application may, while retrieving the set of speech templates corresponding to the character featured in the first scene, retrieve an original speech corresponding to the media asset. For example, the media guidance application may retrieve the original English speech for the movie "Driven." The media guidance application may retrieve the original speech from a local or remote database, or any other digital or analog storage.

In some embodiments, in order to retrieve the set of speech templates, after retrieving the original speech, the media guidance application may retrieve a portion of the original speech corresponding to the first scene. For example, the media guidance application may retrieve the portion of the English speech that corresponds to the first scene of the Japanese dubbed movie "Driven." The media guidance application may use the metadata for the media asset in order to determine a temporal relation between the speech and the scenes. Thus, the media guidance application may retrieve the needed portion of the original speech that corresponds to the first scene. In some embodiments, after retrieving the portion of the original speech, the media guidance application may retrieve the set of speech templates corresponding to the character featured in the first scene based on the retrieved portion of the original speech corresponding to the first scene. For example, the media guidance application may retrieve speech templates based on the original English speech, for when Stallone sounds angry, calm, gentle, loving, alarmed, scared, comic, confused, excited, doubtful, urgent, and accusing. For example, the media guidance application may identify scenes in which the character is supposed to sounds angry and use the portion of the original speech of the scene as the corresponding template.

In order to compare the retrieved portion to each speech template, in some embodiments, the media guidance application may retrieve a first set of vocal characteristics corresponding to the retrieved portion. For example, the media guidance application may retrieve the set of vocal characteristics like pitch, pauses, rate, and rhythm corresponding to the dialog in the first scene of the Japanese dubbed movie "Driven." The media guidance application may use speech-analyzing algorithms to determine the first set of vocal characteristics. In some embodiments, in addition to the first set of vocal characteristics, the media guidance application may retrieve a second set of vocal characteristics corresponding to a speech template from the set of speech templates corresponding to the character featured in the first scene. For example, the media guidance application may retrieve the set of vocal characteristics like pitch, pauses, rate, and rhythm corresponding to each of the templates in which Stallone sounds angry, calm, gentle, loving, alarmed, scared, comic, confused, excited, doubtful, urgent, and accusing. The media guidance application may use speech-analyzing algorithms to determine the second set of vocal characteristics.

In some embodiments, in order to compare the retrieved portion to each speech template, after retrieving the first and the second set of vocal characteristics, the media guidance application may compare a first vocal characteristic from the first set of vocal characteristics to a corresponding second vocal characteristic from the second set of vocal characteristics. For example, the media guidance application may compare the pitch, pauses, rate, and rhythm of the dialog in the first scene of the Japanese dubbed movie "Driven" to the pitch, pauses, rate, and rhythm of each of the templates for Stallone. The media guidance application may use speech-analyzing algorithms to determine if the vocal characteristics match or do not match. The media guidance application may retrieve an allowable error from a local or remote storage that will indicate by how much the first and second vocal characteristics may vary in order to count as a match.

In order to perform the function to adjust the portion of the dubbed speech so that the speech characteristic matches the context of the scene, in some embodiments the media guidance application may retrieve a first set of vocal characteristics corresponding to the portion of the dubbed speech. For example, the media guidance application may retrieve the set of vocal characteristics like pitch, pauses, rate, and rhythm corresponding to the dialog in the first scene of the Japanese dubbed movie "Driven." The media guidance application may use speech-analyzing algorithms to determine the first set of vocal characteristics. In some embodiments, additionally to retrieving the first set of vocal characteristics, the media guidance application may identify a speech template from the set of speech templates corresponding to the character featured in the first scene that has a speech characteristic that matches the context speech characteristic for the context of the first scene. For example, the media guidance application may retrieve the template in which Stallone sounds alarmed. The media guidance application may retrieve a look-up table, from a local or remote database of analog or digital kind, that contains entries for each context of the scenes and a corresponding speech template.

In some embodiments, in order to perform the function to adjust the portion of the dubbed speech so that the speech characteristic matches the context of the scene, after identifying the needed speech template, the media guidance application may retrieve a second set of vocal characteristics corresponding to the speech template that has the speech characteristic that matched the context speech characteristic for the context of the first scene. For example, the media guidance application may retrieve the set of vocal characteristics like pitch, pauses, rate, and rhythm corresponding to the template in which Stallone sounds alarmed. In some embodiments, after retrieving the first and the second set of vocal characteristics, the media guidance application may identify a first vocal characteristic from the first set of vocal characteristics that does not match a corresponding second vocal characteristic from the second set of vocal characteristics. For example, the media guidance application may determine that the speech from the first scene has a different rhythm than the template in which Stallone sounds alarmed. The media guidance application may use speech-analyzing algorithms to determine if the vocal characteristics match or do not match. The media guidance application may retrieve an allowable error from a local or remote storage that will indicate by how much may the first and second vocal characteristics vary in order to count as a match.

In some embodiments, in order to perform the function to adjust the portion of the dubbed speech so that the speech characteristic matches the context of the scene, if the first vocal characteristic exists, the media guidance application may adjust the first vocal characteristic from the first set of vocal characteristics to match the corresponding second vocal characteristic from the second set of vocal characteristics. For example, the media guidance application may adjust the rhythm of the speech from the first scene to be the same as the rhythm of the template in which Stallone sounds alarmed. The media guidance application may vary a vocal characteristic by passing the speech through a modifying filter designed to change only the needed vocal characteristic.

Another way to perform the function to adjust the portion of the dubbed speech so that the speech characteristic matches the context of the scene is exemplified in the embodiment below. In such embodiments, the media guidance application may, while performing the function to adjust the portion of the dubbed speech so that the speech characteristic of the character featured in the first scene matches the context speech characteristic for the context of the first scene, receive metadata corresponding to a second scene from the plurality of scenes. For example, the media guidance application may receive metadata for a second scene from the Japanese dubbed movie "Driven." The media guidance application may receive the metadata from a local storage, a remote database, or any other digital or analog storage. The media guidance application may query the storage for the media asset before, after or at the same time as receiving the media asset, the query including an identifier for the media asset. The media guidance application may store the metadata in a local storage, a remote database, or any other digital or analog storage.

In some embodiments, in order to perform the function to adjust the portion of the dubbed speech so that the speech characteristic matches the context of the scene, after receiving the metadata, the media guidance application may determine the context of the second scene based on the metadata corresponding to the second scene. For example, the media guidance application may determine that the second scene is an action scene.

In some embodiments, in order to perform the function to adjust the portion of the dubbed speech so that the speech characteristic matches the context of the scene, after determining the context, the media guidance application may retrieve a context speech characteristic for the context of the second scene. For example, the media guidance application may retrieve from a look-up table that the speech characteristic is alarmed. In some embodiments, additionally to retrieving the context speech characteristic, the media guidance application may determine that the context speech characteristic for the context of the first scene matches the context speech characteristic for the context of the second scene. For example, the media guidance application may determine that Stallone is supposed to sound alarmed in both scenes.

In some embodiments, in order to perform the function to adjust the portion of the dubbed speech so that the speech characteristic matches the context of the scene, the media guidance application may retrieve a portion of the dubbed speech corresponding to the second scene. For example, the media guidance application may retrieve the dialog of the second scene. In some embodiments, the media guidance application may retrieve a first set of vocal characteristics corresponding to the portion of the dubbed speech corresponding to the first scene. For example, the media guidance application may retrieve the set of vocal characteristics like pitch, pauses, rate, and rhythm corresponding to the dialog in the first scene of the Japanese dubbed movie "Driven."

In some embodiments, in order to perform the function to adjust the portion of the dubbed speech so that the speech characteristic matches the context of the scene, additionally to retrieving the first set of vocal characteristics, the media guidance application may retrieve a second set of vocal characteristics corresponding to the portion of the dubbed speech corresponding to the second scene. For example, the media guidance application may retrieve the set of vocal characteristics like pitch, pauses, rate, and rhythm corresponding to the dialog in the second scene of the Japanese dubbed movie "Driven." In some embodiments, after retrieving the first and second set of vocal characteristics, the media guidance application may identify a first vocal characteristic from the first set of vocal characteristics that does not match a corresponding second vocal characteristic from the second set of vocal characteristics. For example, the media guidance application may determine that the dialog in the first scene has a different rhythm than the dialog in the second scene.

In some embodiments, in order to perform the function to adjust the portion of the dubbed speech so that the speech characteristic matches the context of the scene, the media guidance application may adjust the first vocal characteristic from the first set of vocal characteristics to match the corresponding second vocal characteristic from the second set of vocal characteristics. For example, the media guidance application may adjust the rhythm of the dialog in the first scene to match that of the second scene.

Additionally, in some embodiments, the media guidance application may retrieve a portion of an adjusted dubbed speech corresponding to the first scene. For example, the media guidance application may retrieve the adjusted dubbed speech of Stallone from the first scene. In some embodiments, after retrieving the needed portion, the media guidance application may compare the retrieved portion of the adjusted dubbed speech corresponding to the first scene to each speech template from the set of speech templates corresponding to the character featured in the first scene to identify a speech template that corresponds to the retrieved portion of the adjusted dubbed speech. For example, the media guidance application may compare the dialog in the first scene of the Japanese dubbed movie "Driven" to each of the templates in which Stallone sounds angry, calm, gentle, loving, alarmed, scared, comic, confused, excited, doubtful, urgent, and accusing and identify that Stallone now sounds alarmed in the first scene of the Japanese dubbed movie "Driven."

Further, in some embodiments, the media guidance application may identify a speech characteristic associated with the identified speech template that corresponds to the retrieved portion of the adjusted dubbed speech. For example, the media guidance application may determine that Stallone now sounds alarmed. In some embodiments, after identifying the speech characteristic, the media guidance application may determine that the identified speech characteristic of the character featured in the first scene that corresponds to the retrieved portion of the adjusted dubbed speech matches the context speech characteristic for the context of the first scene. For example, the media guidance application may determine that Stallone is supposed to sound alarmed and indeed does sound alarmed.

BRIEF DESCRIPTION

Figure 8:
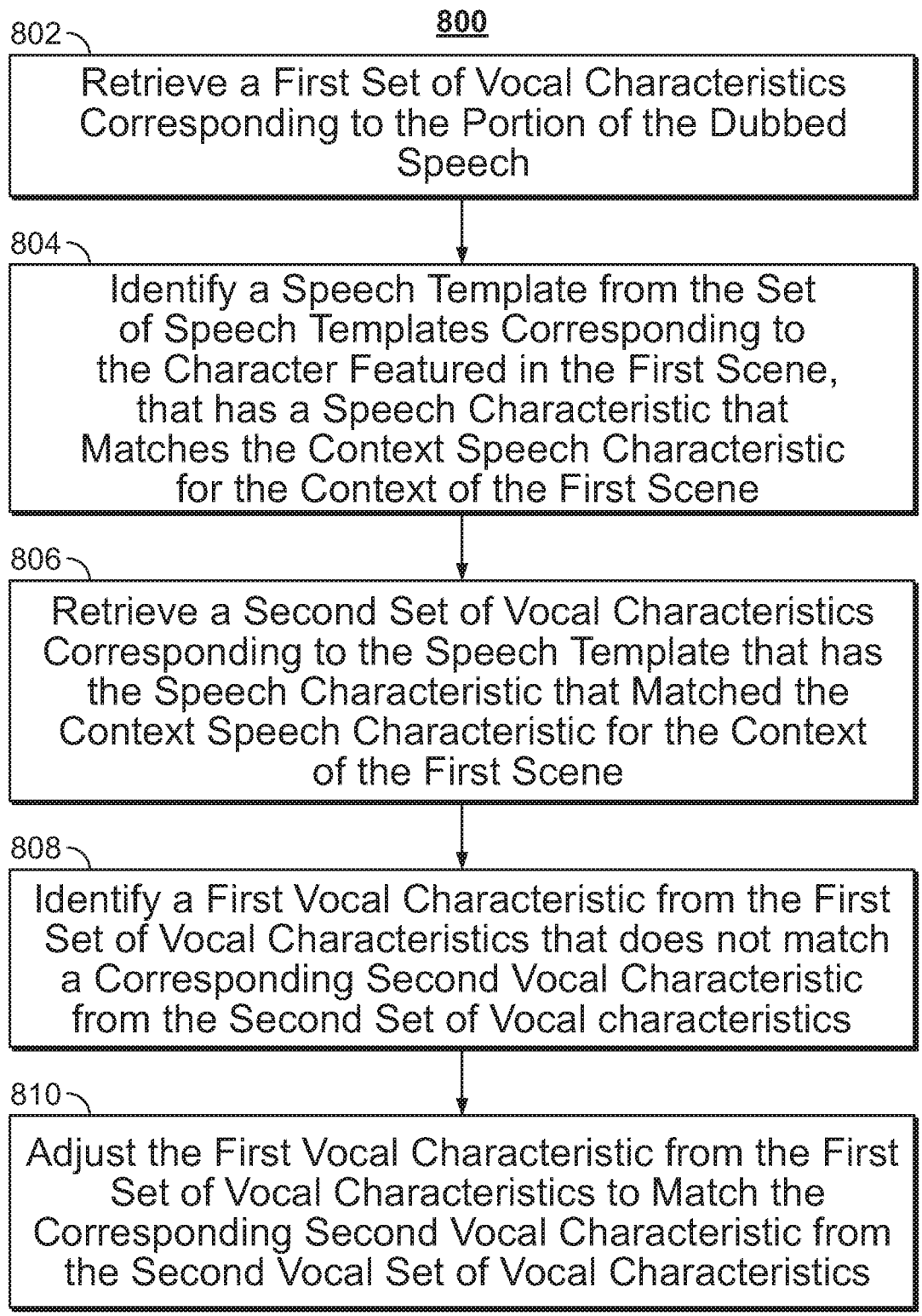
Figure 9:
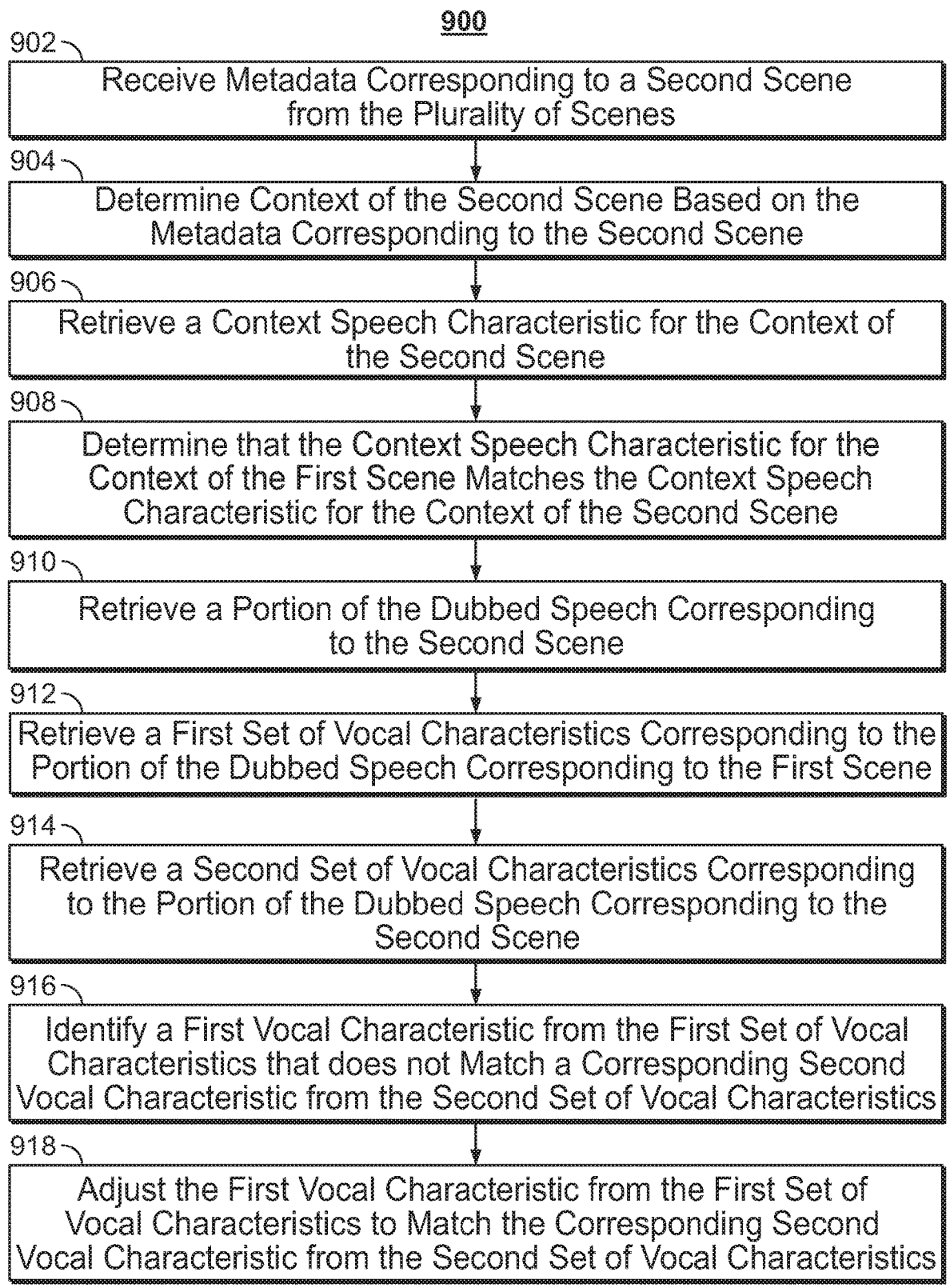

FIG. 8 depicts an illustrative flowchart of a process for performing the function to adjust the portion of the dubbed speech using a speech template, in accordance with some embodiments of the disclosure; and FIG. 9 depicts an illustrative flowchart of a process for performing the function to adjust the portion of the dubbed speech using a second scene, in accordance with some embodiments of the disclosure.

DETAILED DESCRIPTION

Systems and methods are provided herein for adjusting dubbed speech based on the context of a scene. The media guidance application may determine that a media asset contains dubbed speech and decompose the media asset into scenes, according to the media asset's metadata. Further, the media guidance application may determine the type of the scene, e.g., an action scene, a love scene, etc., using the metadata of the scene and check if the intonation of the actor's dubbed speech is consistent with the type of the scene. Finally, the media guidance application may modify the dubbed speech to make the intonation and the type of the scene consistent. For example, the media guidance application may detect a dubbed speech corresponding to the actor Sylvester Stallone in the Japanese dubbed movie "Driven." The media guidance application may split the movie into a set of scenes and determine that the first scene is a car chase. Further, for example, the media guidance application may determine that the dubbed speech in Japanese sounds calm where it is expected that Sylvester Stallone should sound alarmed in a car chase scene. Even further, for example, the media guidance application may adjust the Japanese dubbed speech so that Sylvester Stallone sounds alarmed in the car chase scene.

Figure 1:
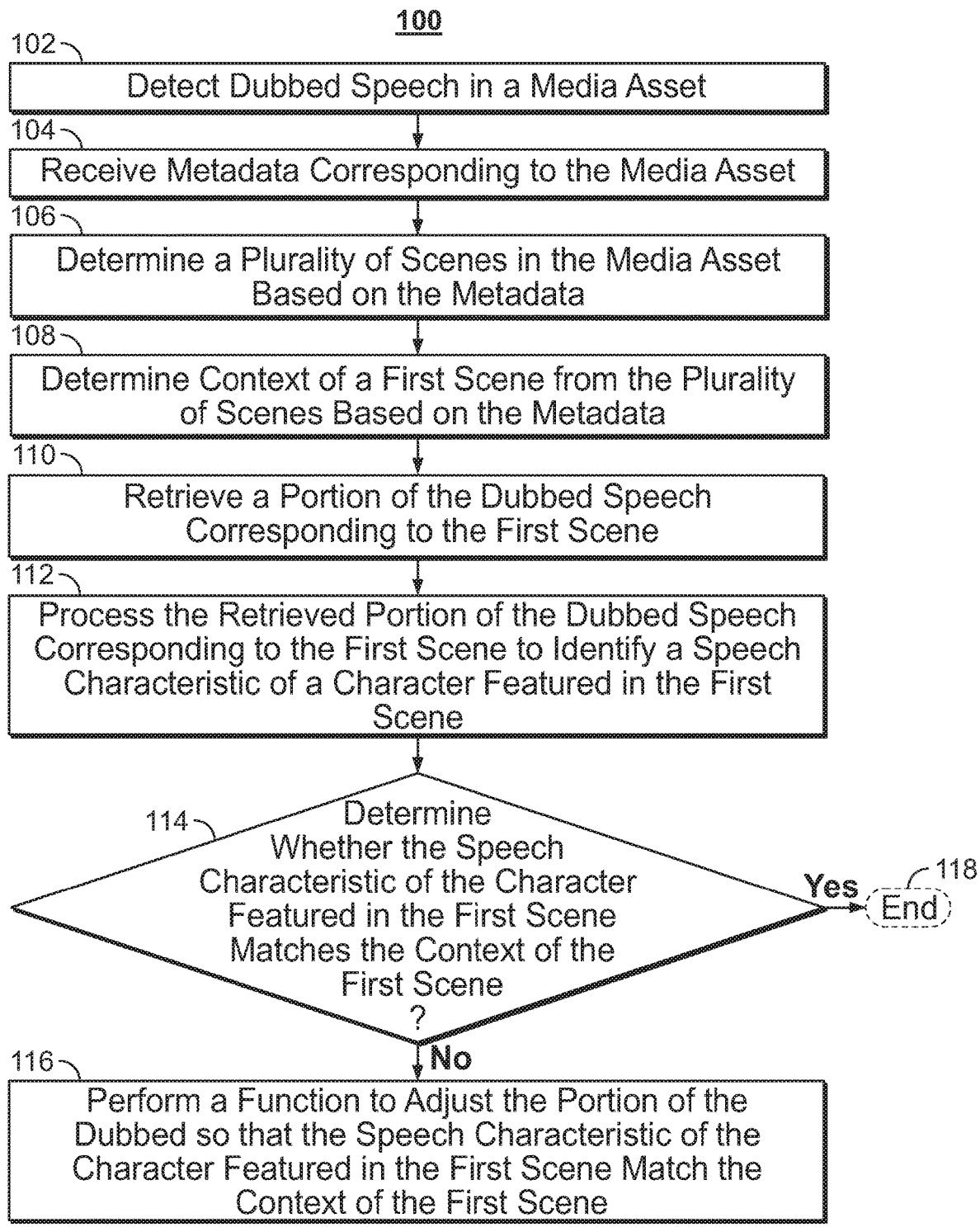
FIG. 1 depicts an illustrative flowchart of a process for adjusting dubbed speech based on the context of a scene, in accordance with some embodiments of the disclosure.

FIG. 1 depicts an illustrative flowchart of a process 100 for detecting and correcting a mismatch between a speech characteristic of a portion of a dubbed speech of a character featured in a scene and context of the scene, in accordance with some embodiments of the disclosure.

Process 100 begins at 102. At 102, the media guidance application may detect dubbed speech in a media asset. For example, the media guidance application may detect dubbed speech in the Japanese dubbed movie "Driven."

As used herein, the term "dubbed speech" is defined to mean speech that was voiced in a language or fashion other than the original language or fashion. For example, Stallone voiced in Japanese may be considered dubbed speech. Examples of dubbed speech are lines of an American actor translated and voiced in a language other than English, lines of an actor voiced by a different actor in order to modify the original accent or any other characteristics of the lines by the original actor, and the like.

In order to detect the dubbed speech in the media asset, in some embodiments, the media guidance application may retrieve video information corresponding to the media asset. For example, the media guidance application may retrieve the video files corresponding to the Japanese dubbed movie "Driven." The media guidance application may retrieve the video information from a local storage, a remote database, or any other type of digital or analog storage by sending a query to the database. The media guidance application may send to query to the database before, after or at the same time as receiving the media asset. In some embodiments, additionally, the media guidance application may retrieve audio information corresponding to the media asset. For example, the media guidance application may retrieve the audio files corresponding to the Japanese dubbed movie "Driven." The media guidance application may retrieve the audio information from a local storage, a remote database, or any other type of digital or analog storage.

In some embodiments, in order to determine the dubbed speech, once the audio information is retrieved, the media guidance application may retrieve speech information of the character corresponding to the audio information. For example, the media guidance application may retrieve the part of the dubbed audio files that corresponds to Sylvester Stallone. The media guidance application may attempt to determine dubbed speech for each of the characters, for the main character, or for any character at random. The media guidance application may analyze the retrieved audio information and determine which sounds correspond to the character speaking. The media guidance application may achieve this by using voice recognition techniques or by using the metadata associated with the audio information. In some embodiments, once the video information is retrieved, the media guidance application may retrieve facial movements of the character corresponding to the video information. For example, the media guidance application may retrieve Stallone's facial movements from the video files. The media guidance application may analyze the retrieved video information and identify the character's face using face recognition techniques, in order to isolate the character's facial movements.

In some embodiments, in order to detect the dubbed speech, after retrieving the speech information and the facial movements, the media guidance application may determine whether the facial movements of the character correspond to the speech information. For example, the media guidance application may determine if Stallone's potentially dubbed speech corresponds to his facial movements. The media guidance application may use computer algorithms to generate expected facial movements corresponding to the speech information and then compare the expected facial movements to the facial movements. In some embodiments, the media guidance application may, in response to determining that the facial movements of the character do not correspond to the speech information, detect the dubbed speech in the media asset. For example, if what Stallone is saying does not correspond to his facial movements, the media guidance application may determine that the speech is dubbed.

At 104, the media guidance application may receive metadata corresponding to the media asset. For example, the media guidance application may, in response to detecting dubbed speech in the Japanese dubbed movie "Driven," receive the metadata of the Japanese dubbed movie "Driven."

As used herein, the term "metadata" is defined to mean a set of information that describes a media asset. Examples of what a media asset metadata can include are title, abstract, synopsis, review, author, characters, subtitles, keywords, scenes, context of scenes, chapters, and the like.

In some embodiments, the media guidance application may receive the metadata from a local storage, a remote database, or any other digital or analog storage. The media guidance application may query the storage for the media asset before, after or the same time as receiving the media asset, the query including an identifier for the media asset.

In some embodiments, the media guidance application may store the metadata in a local storage, a remote database, or any other digital or analog storage.

At 106, the media guidance application may determine a plurality of scenes in the media asset based on the metadata. For example, the media guidance application may determine that the Japanese dubbed movie "Driven" has one hundred scenes, based on the received metadata. The media guidance application may determine the scenes using markers in the metadata indicating the start of a new scene. The media guidance application may create new metadata entries, one per scene.

At 108, the media guidance application may determine the context of a first scene from the plurality of scenes based on the metadata. For example, the media guidance application may determine that the first scene is an action scene. Ways of determining the context from the metadata are described below.

As used herein, the term "context" is defined to mean a categorization of a scene in a media asset. For example, the context of the first scene from the Japanese dubbed movie "Driven" may be an action context. Examples of contexts are a love context, an action context, a danger context, a scary context, a conflict context, a relaxing context, a rush context, a fear context, and the like.

In some embodiments, after determining the scenes, the media guidance application may receive metadata corresponding to a first scene from the plurality of scenes. For example, the media guidance application may receive the metadata corresponding to the first scene of the Japanese dubbed movie "Driven." Further, in some embodiments, after receiving the first scene metadata, the media guidance application may determine the context of the first scene based on the metadata corresponding to the first scene. For example, the media guidance application may determine that the first scene is a car chase scene and thus an action scene.

In order to determine the context of the first scene, in some embodiments, the media guidance application may retrieve a plurality of keywords corresponding to the metadata corresponding to the first scene. For example, the media guidance application may retrieve the keywords "car," "chase," "danger," and "shooting," from the metadata of the first scene. In some embodiments, after receiving the plurality of keywords, the media guidance application may determine the context of the first scene based on a subset of the plurality of the keywords corresponding to the metadata corresponding to the first scene. For example, the media guidance application may determine, based on the retrieved keywords "car," "chase," and "shooting," that the scene is an action scene. The media guidance application may retrieve a look-up table containing a list of keywords corresponding to each context of the scene. The media guidance application may retrieve the look-up table from a local or remote database, or any other digital or analog storage.

In some embodiments, after determining the context of the first scene, the media guidance application may retrieve a context speech characteristic for the context of the first scene. For example, the media guidance application may determine from a look-up table the speech characteristic should sound alarmed for a scene that is an action scene. In order to retrieve the context speech characteristic, in some embodiments, the media guidance application may retrieve personality metadata corresponding to the character, wherein the personality metadata includes expected speech characteristics for each context for the character. For example, the media guidance application may retrieve the personality metadata for Stallone and determine that Stallone is expected to be alarmed in an action scene and calm in a relaxing scene. The media guidance application may retrieve personality metadata for each of the characters, for the main character, or for any character at random. The media guidance application may retrieve the personality metadata from a local or remote database, or any other digital or analog storage. In some embodiments, after retrieving the personality metadata, the media guidance application may identify the context speech characteristic as the expected speech characteristic for the context of the first scene based on the personality metadata corresponding to the character. For example, the media guidance application may determine that Stallone is supposed to sound alarmed in the first scene, since it is an action scene. The media guidance application may find the context of the first scene in the personality metadata and retrieve the expected speech characteristic for the character.

At 110, the media guidance application may retrieve a portion of the dubbed speech corresponding to the first scene. For example, the media guidance application may retrieve the dialog that occurs during the first scene of the Japanese dubbed movie "Driven."

The media guidance application may use temporal markers from the metadata to identify when a scene starts and determine the dubbed speech of the scene as the speech that occurs during the time of the first scene.

At 112, the media guidance application may process the retrieved portion of the dubbed speech corresponding to the first scene to identify a speech characteristic of a character featured in the first scene. For example, the media guidance application may identify that Stallone sounds gentle in the first scene.

In some embodiments, the media guidance application may retrieve a set of speech templates corresponding to a character featured in the first scene, wherein each speech template from the set of speech templates corresponds to a different speech characteristic of the character featured in the first scene. For example, the media guidance application may retrieve, from a database, speech templates for Stallone for when he sounds angry, calm, gentle, loving, alarmed, scared, comic, confused, excited, doubtful, urgent, and accusing.

In some embodiments, after retrieving the set of speech templates, the media guidance application may compare the retrieved portion of the dubbed speech corresponding to the first scene to each speech template from the set of speech templates corresponding to the character featured in the first scene to identify a speech template that corresponds to the retrieved portion. For example, the media guidance application may compare the dialog in the first scene of the Japanese dubbed movie "Driven" to each of the templates in which Stallone sounds angry, calm, gentle, loving, alarmed, scared, comic, confused, excited, doubtful, urgent, and accusing and identify that Stallone sounds gentle in the first scene of the Japanese dubbed movie "Driven." Ways of comparing are described in greater detail below. In some embodiments, after identifying the speech template, the media guidance application may identify a speech characteristic associated with the identified speech template. For example, the media guidance application may identify that the template in which Stallone sounds gentle corresponds to the speech characteristic "gentle."

In order to retrieve the set of speech templates, in some embodiments, the media guidance application may retrieve a language of the dubbed speech corresponding to the media asset. For example, the media guidance application may retrieve from a database or the metadata of the Japanese dubbed movie "Driven" that this movie is in Japanese. The media guidance application may retrieve the language from the metadata of the media asset or from a local or remote database, or any other digital or analog storage. In some embodiments, after retrieving the language of the dubbed speech, the media guidance application may retrieve the set of speech templates corresponding to the character featured in the first scene and corresponding to the language of the dubbed speech. For example, the media guidance application may retrieve from a database speech templates for Stallone in Japanese for when he sounds angry, calm, gentle, loving, alarmed, scared, comic, confused, excited, doubtful, urgent, and accusing. The media guidance application may retrieve a look-up table from a local or remote database, or any other digital or analog storage, including a set of templates for each language. The media guidance application may then find the entry corresponding to the retrieved language in the look-up table, and retrieve the set of speech templates for that language.

An alternative method for retrieving the set of speech templates corresponding to the character featured in the first scene is described below. In such embodiments, the media guidance application may determine a foreign talent who performed the dubbing. The media guidance application may determine the foreign talent from the credits, or get this information from the metadata or from an online query for the media asset. The media guidance application may send a query to the foreign talent in order to receive the templates.

An alternative method for retrieving the set of speech templates corresponding to the character featured in the first scene is described below. In such embodiments, the media guidance application may, while retrieving the set of speech templates corresponding to the character featured in the first scene, retrieve an original speech corresponding to the media asset. For example, the media guidance application may retrieve the original, English speech, for the movie "Driven." The media guidance application may retrieve the original speech from a local or remote database, or any other digital or analog storage.

In some embodiments, in order to retrieve the set of speech templates, after retrieving the original speech, the media guidance application may retrieve a portion of the original speech corresponding to the first scene. For example, the media guidance application may retrieve the portion of the English speech that corresponds to the first scene of the Japanese dubbed movie "Driven." The media guidance application may use the metadata for the media asset in order to determine a temporal relation between the speech and the scenes. Thus, the media guidance application may retrieve the needed portion of the original speech that corresponds to the first scene. In some embodiments, after retrieving the portion of the original speech, the media guidance application may retrieve the set of speech templates corresponding to the character featured in the first scene based on the retrieved portion of the original speech corresponding to the first scene. For example, the media guidance application may retrieve speech templates based on the original English speech, for when Stallone sounds angry, calm, gentle, loving, alarmed, scared, comic, confused, excited, doubtful, urgent, and accusing. For example, the media guidance application may identify scenes in which the character is supposed to sound angry and use the portion of the original speech of the scene as the corresponding template.

In order to compare the retrieved portion to each speech template, in some embodiments, the media guidance application may retrieve a first set of vocal characteristics corresponding to the retrieved portion. For example, the media guidance application may retrieve the set of vocal characteristics like pitch, pauses, rate, and rhythm corresponding to the dialog in the first scene of the Japanese dubbed movie "Driven." The media guidance application may use speech-analyzing algorithms to determine the first set of vocal characteristics. In some embodiments, in addition to the first set of vocal characteristics, the media guidance application may retrieve a second set of vocal characteristics corresponding to a speech template from the set of speech templates corresponding to the character featured in the first scene. For example, the media guidance application may retrieve the set of vocal characteristics like pitch, pauses, rate, and rhythm corresponding to the each of the templates in which Stallone sounds angry, calm, gentle, loving, alarmed, scared, comic, confused, excited, doubtful, urgent, and accusing. The media guidance application may use speech-analyzing algorithms to determine the second set of vocal characteristics.

At 114, the media guidance application may determine whether the speech characteristic of the character featured in the first scene matches the context speech characteristic for the context of the first scene. For example, the media guidance application may determine that Stallone is supposed to sound alarmed in the first scene but he actually sounds gentle. The media guidance application may query a database to receive a look-up table. The database may be a local or remote storage of an analog or digital kind. The media guidance application may receive the look-up table via wireless or wired communications. The media guidance application may parse the look-up table in order to determine if the speech characteristic matches the context of the first scene.

At 116, the media guidance application may, in response to determining that the speech characteristic of the character featured in the first scene fails to match the context speech characteristic for the context of the first scene, perform a function to adjust the portion of the dubbed speech so that the speech characteristic of the character featured in the first scene matches the context speech characteristic for the context of the first scene. For example, the media guidance application may adjust Stallone's speech in the first scene so that he sounds alarmed instead of gentle.

In order to perform the function to adjust the portion of the dubbed speech so that the speech characteristic matches the context of the scene, in some embodiments, the media guidance application may retrieve a first set of vocal characteristics corresponding to the portion of the dubbed speech. For example, the media guidance application may retrieve the set of vocal characteristics like pitch, pauses, rate, and rhythm corresponding to the dialog in the first scene of the Japanese dubbed movie "Driven." The media guidance application may use speech-analyzing algorithms to determine the first set of vocal characteristics. In some embodiments, additionally to retrieving the first set of vocal characteristics, the media guidance application may identify a speech template from the set of speech templates corresponding to the character featured in the first scene, that has a speech characteristic that matches the context speech characteristic for the context of the first scene. For example, the media guidance application may retrieve the template in which Stallone sounds alarmed. The media guidance application may retrieve a look-up table, from a local or remote database of analog or digital kind, that contains entries for each context of the scenes and a corresponding speech template.

In some embodiments, in order to perform the function to adjust the portion of the dubbed speech so that the speech characteristic matches the context of the scene, after identifying the needed speech template, the media guidance application may retrieve a second set of vocal characteristics corresponding to the speech template that has the speech characteristic that matched the context speech characteristic for the context of the first scene. For example, the media guidance application may retrieve the set of vocal characteristics like pitch, pauses, rate, and rhythm corresponding to the template in which Stallone sounds alarmed. In some embodiments, after retrieving the first and the second set of vocal characteristics, the media guidance application may identify a first vocal characteristic from the first set of vocal characteristics that does not match a corresponding second vocal characteristic from the second set of vocal characteristics. For example, the media guidance application may determine that the speech from the first scene has a different rhythm than the template in which Stallone sounds alarmed. The media guidance application may use speech-analyzing algorithms to determine if the vocal characteristics match or do not match. The media guidance application may retrieve an allowable error from a local or remote storage that will indicate by how much the first and second vocal characteristics may vary in order to count as a match.

In some embodiments, in order to perform the function to adjust the portion of the dubbed speech so that the speech characteristic matches the context of the scene, if the first vocal characteristic exists, the media guidance application may adjust the first vocal characteristic from the first set of vocal characteristics to match the corresponding second vocal characteristic from the second set of vocal characteristics. For example, the media guidance application may adjust the rhythm of the speech from the first scene to be the same as the rhythm of the template in which Stallone sounds alarmed. The media guidance application may vary a vocal characteristic by passing the speech through a modifying filter designed to change only the needed vocal characteristic.

Another way to perform the function to adjust the portion of the dubbed speech so that the speech characteristic matches the context of the scene is exemplified in the embodiment below. In such embodiments, the media guidance application may, while performing the function to adjust the portion of the dubbed speech so that the speech characteristic of the character featured in the first scene matches the context speech characteristic for the context of the first scene, receive metadata corresponding to a second scene from the plurality of scenes. For example, the media guidance application may receive metadata for a second scene from the Japanese dubbed movie "Driven." The media guidance application may receive the metadata from a local storage, a remote database, or any other digital or analog storage. The media guidance application may query the storage for the media asset before, after or at the same time as receiving the media asset, the query including an identifier for the media asset. The media guidance application may store the metadata in a local storage, a remote database, or any other digital or analog storage.

In some embodiments, in order to perform the function to adjust the portion of the dubbed speech so that the speech characteristic matches the context of the scene, after receiving the metadata, the media guidance application may determine the context of the second scene based on the metadata corresponding to the second scene. For example, the media guidance application may determine that the second scene is an action scene.

In some embodiments, in order to perform the function to adjust the portion of the dubbed speech so that the speech characteristic matches the context of the scene, after determining the context, the media guidance application may retrieve a context speech characteristic for the context of the second scene. For example, the media guidance application may retrieve from a look-up table that the speech characteristic is alarmed. In some embodiments, additionally to retrieving the context speech characteristic, the media guidance application may determine that the context speech characteristic for the context of the first scene matches the context speech characteristic for the context of the second scene. For example, the media guidance application may determine that Stallone is supposed to sound alarmed in both scenes.

In some embodiments, in order to perform the function to adjust the portion of the dubbed speech so that the speech characteristic matches the context of the scene, the media guidance application may retrieve a portion of the dubbed speech corresponding to the second scene. For example, the media guidance application may retrieve the dialog of the second scene. In some embodiments, the media guidance application may retrieve a first set of vocal characteristics corresponding to the portion of the dubbed speech corresponding to the first scene. For example, the media guidance application may retrieve the set of vocal characteristics like pitch, pauses, rate, and rhythm corresponding to the dialog in the first scene of the Japanese dubbed movie "Driven."

In some embodiments, in order to perform the function to adjust the portion of the dubbed speech so that the speech characteristic matches the context of the scene, additionally to retrieving the first set of vocal characteristics, the media guidance application may retrieve a second set of vocal characteristics corresponding to the portion of the dubbed speech corresponding to the second scene. For example, the media guidance application may retrieve the set of vocal characteristics like pitch, pauses, rate, and rhythm corresponding to the dialog in the second scene of the Japanese dubbed movie "Driven." In some embodiments, after retrieving the first and second set of vocal characteristics, the media guidance application may identify a first vocal characteristic from the first set of vocal characteristics that does not match a corresponding second vocal characteristic from the second set of vocal characteristics. For example, the media guidance application may determine that the dialog in the first scene has a different rhythm than the dialog in the second scene.

In some embodiments, in order to perform the function to adjust the portion of the dubbed speech so that the speech characteristic matches the context of the scene, the media guidance application may adjust the first vocal characteristic from the first set of vocal characteristics to match the corresponding second vocal characteristic from the second set of vocal characteristics. For example, the media guidance application may adjust the rhythm of the dialog in the first scene to match that of the second scene.

Additionally, in some embodiments, the media guidance application may retrieve a portion of an adjusted dubbed speech corresponding to the first scene. For example, the media guidance application may retrieve the adjusted dubbed speech of Stallone from the first scene. In some embodiments, after retrieving the needed portion, the media guidance application may compare the retrieved portion of the adjusted dubbed speech corresponding to the first scene to each speech template from the set of speech templates corresponding to the character featured in the first scene to identify a speech template that corresponds to the retrieved portion of the adjusted dubbed speech. For example, the media guidance application may compare the dialog in the first scene of the Japanese dubbed movie "Driven" to each of the templates in which Stallone sounds angry, calm, gentle, loving, alarmed, scared, comic, confused, excited, doubtful, urgent, and accusing and identify that Stallone now sounds alarmed in the first scene of the Japanese dubbed movie "Driven."

Further, in some embodiments, the media guidance application may identify a speech characteristic associated with the identified speech template that corresponds to the retrieved portion of the adjusted dubbed speech. For example, the media guidance application may determine that Stallone now sounds alarmed. In some embodiments, after identifying the speech characteristic, the media guidance application may determine that the identified speech characteristic of the character featured in the first scene that corresponds to the retrieved portion of the adjusted dubbed speech matches the context speech characteristic for the context of the first scene. For example, the media guidance application may determine that Stallone is supposed to sound alarmed and indeed does sound alarmed.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
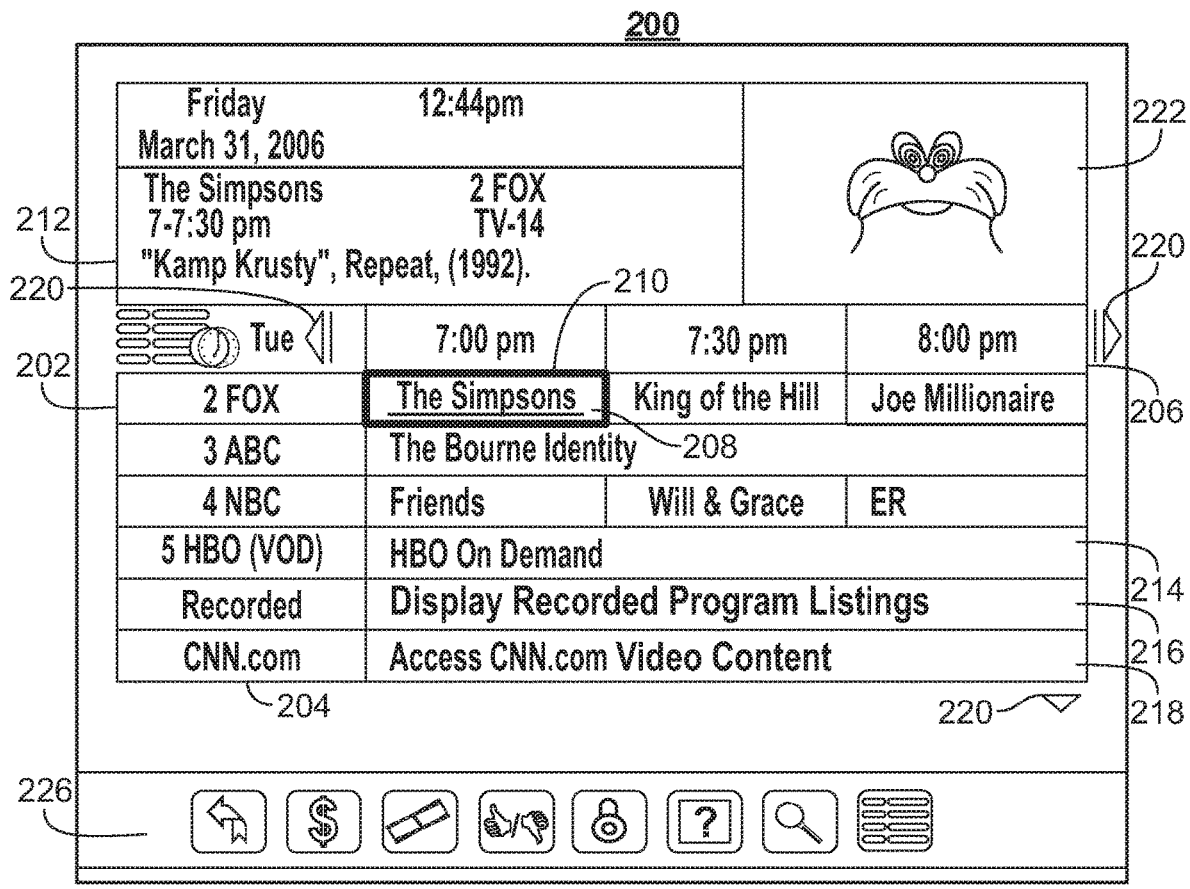
FIG. 2 shows an illustrative embodiment of a display screen that may be used to provide media guidance application listings and other media guidance information, in accordance with some embodiments of the disclosure.
Figure 3:
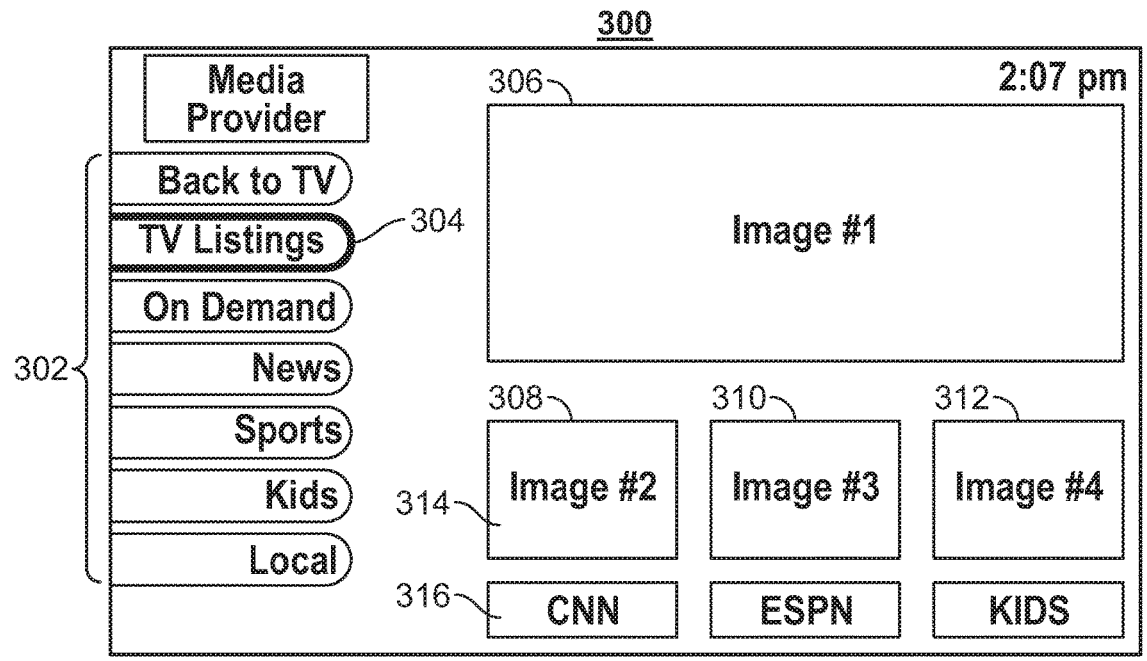
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay 102, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
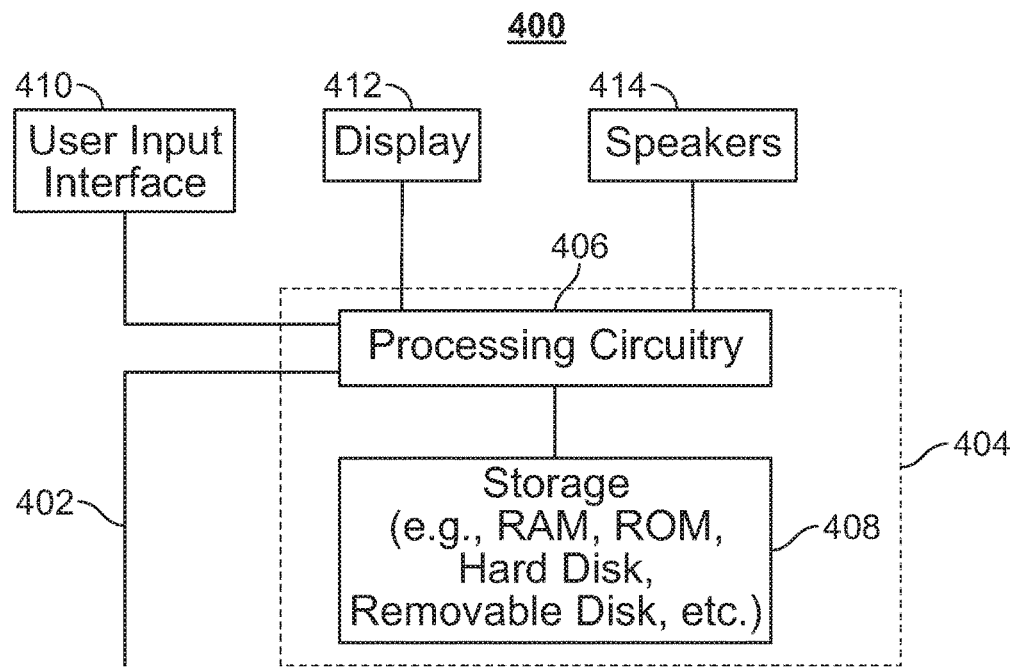
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
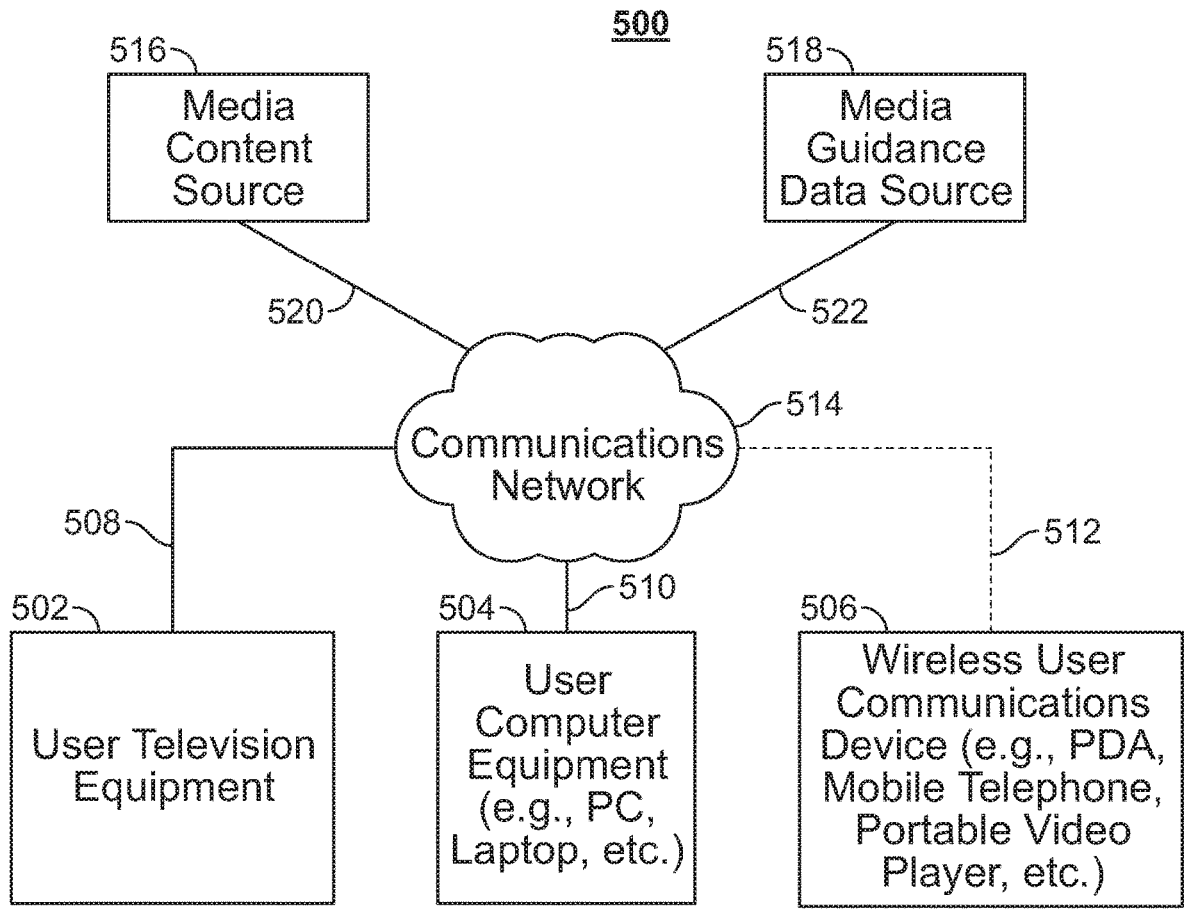
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a web site via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
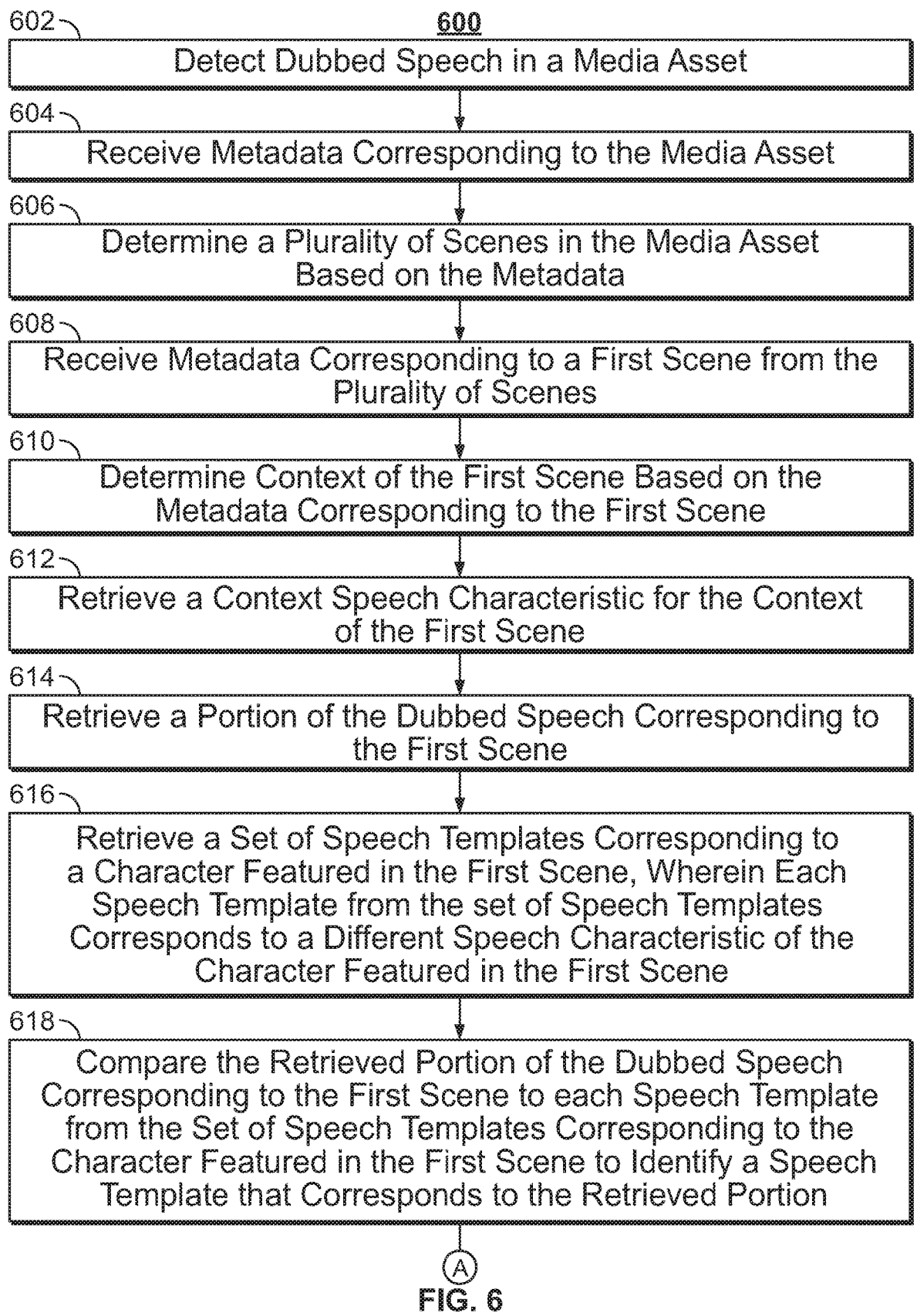
FIG. 6 depicts an illustrative flowchart of a process for detecting and correcting a mismatch between a speech characteristic of a portion of a dubbed speech of a character featured in a scene and the context of the scene in accordance with some embodiments of the disclosure.
Figure 6:
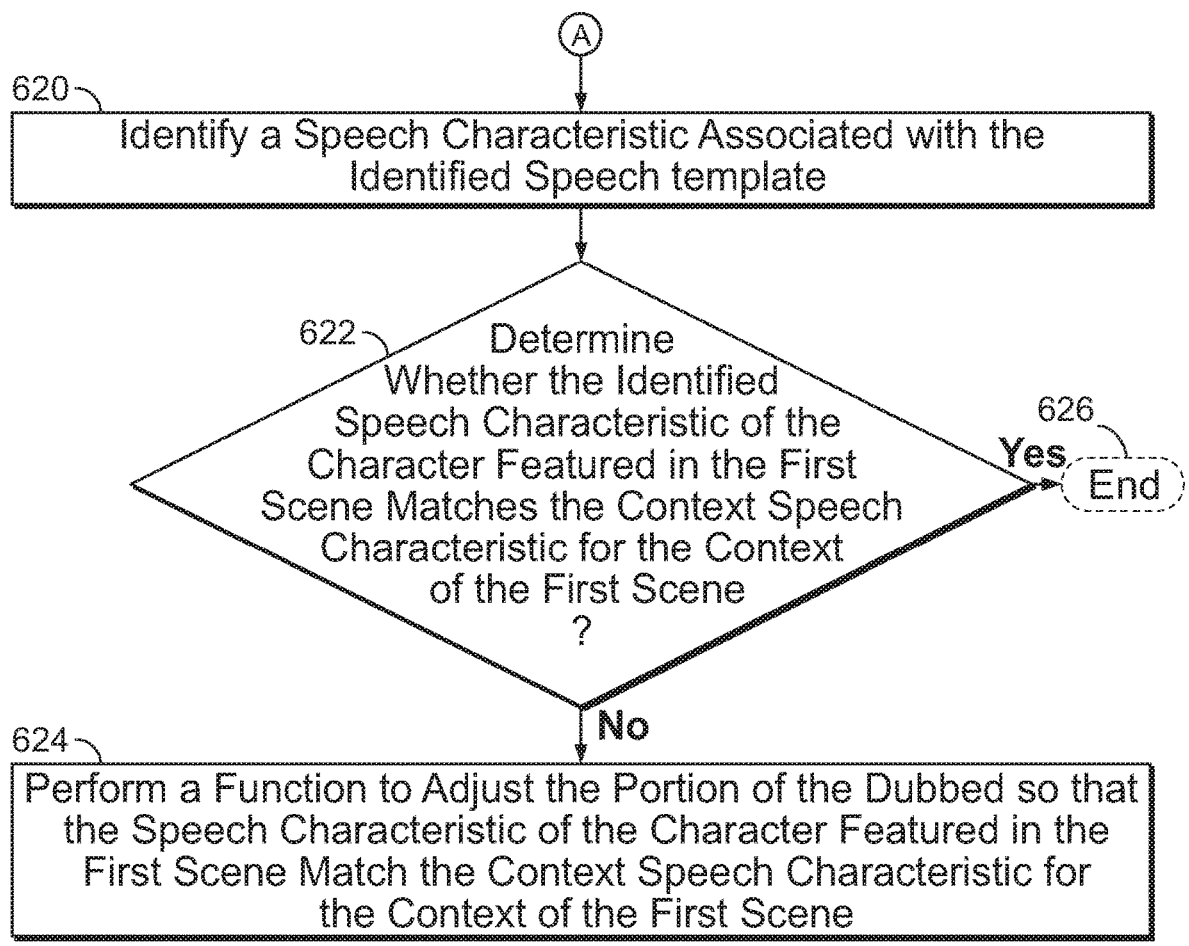

FIG. 6 depicts an illustrative flowchart of a process for detecting and correcting a mismatch between a speech characteristic of a portion of a dubbed speech of a character featured in a scene and context of the scene, in accordance with some embodiments of the disclosure. Process 600 may be executed by control circuitry 404 (e.g., in a manner instructed to control circuitry 404 by the media guidance application). Control circuitry 404 may be part of a remote server separated from the user equipment by way of communications network 514.

Process 600 begins at step 602. At 602, control circuitry 404 detects dubbed speech in a media asset. For example, control circuitry 404 detects dubbed speech in the Japanese dubbed movie "Driven." The process for detecting dubbed speech is discussed in more detail in connection with FIG. 7 below.

At 604, control circuitry 404 receives metadata corresponding to the media asset. For example, control circuitry 404, in response to detecting dubbed speech in the Japanese dubbed movie "Driven," receives the metadata of the Japanese dubbed movie "Driven."

At 606, control circuitry 404 determines a plurality of scenes in the media asset based on the metadata. For example, control circuitry 404 determines that the Japanese dubbed movie "Driven" has one hundred scenes, based on the received metadata.

At 608, control circuitry 404 receives metadata corresponding to a first scene from the plurality of scenes. For example, control circuitry 404 receives the metadata corresponding to the first scene of the Japanese dubbed movie "Driven."

At 610, control circuitry 404 determines context of the first scene based on the metadata corresponding to the first scene. For example, control circuitry 404 determines that the first scene is a car chase scene and thus an action scene.

At 612, control circuitry 404 retrieves a context speech characteristic for the context of the first scene. For example, control circuitry 404 determines from a look-up table the speech characteristic should be alarmed for a scene that is an action scene.

At 614, control circuitry 404 retrieves a portion of the dubbed speech corresponding to the first scene. For example, control circuitry 404 retrieves the dialog that occurs during the first scene of the Japanese dubbed movie "Driven."

At 616, control circuitry 404 retrieves a set of speech templates corresponding to a character featured in the first scene, wherein each speech template from the set of speech templates corresponds to a different speech characteristic of the character featured in the first scene. For example, control circuitry 404 retrieves, from a database, speech templates for Stallone for when he sounds angry, calm, gentle, loving, alarmed, scared, comic, confused, excited, doubtful, urgent, and accusing.

At 618, control circuitry 404 compares the retrieved portion of the dubbed speech corresponding to the first scene to each speech template from the set of speech templates corresponding to the character featured in the first scene to identify a speech template that corresponds to the retrieved portion. For example, control circuitry 404 compares the dialog in the first scene of the Japanese dubbed movie "Driven" to each of the templates in which Stallone sounds angry, calm, gentle, loving, alarmed, scared, comic, confused, excited, doubtful, urgent, and accusing and identifies that Stallone sounds gentle in the first scene of the Japanese dubbed movie "Driven."

At 620, control circuitry 404 identifies a speech characteristic associated with the identified speech template. For example, control circuitry 404 identifies that the template in which Stallone sounds gentle corresponds to the speech characteristic "gentle."

At 622, control circuitry 404 determines whether the identified speech characteristic of the character featured in the first scene matches the context speech characteristic for the context of the first scene. For example control circuitry 404 determines that Stallone is supposed to sound alarmed in the first scene but he actually sounds gentle.

At 624, control circuitry 404 determines that the identified speech characteristic of the character featured in the first scene fails to match the context speech characteristic for the context of the first scene, and process 600 continues to step 624. At 624, control circuitry 404 performs a function to adjust the portion of the dubbed speech so that the speech characteristic of the character featured in the first scene matches the context speech characteristic for the context of the first scene. For example, control circuitry 404 adjusts Stallone's speech in the first scene so that he sounds alarmed instead of gentle. The process for performing the function to adjust the portion of the dubbed speech is discussed in more detail in connection with FIGS. 8 and 9 below.

If control circuitry 404 determines that the identified speech characteristic of the character featured in the first scene matches the context speech characteristic for the context of the first scene, process 600 ends at step 626.

Figure 7:
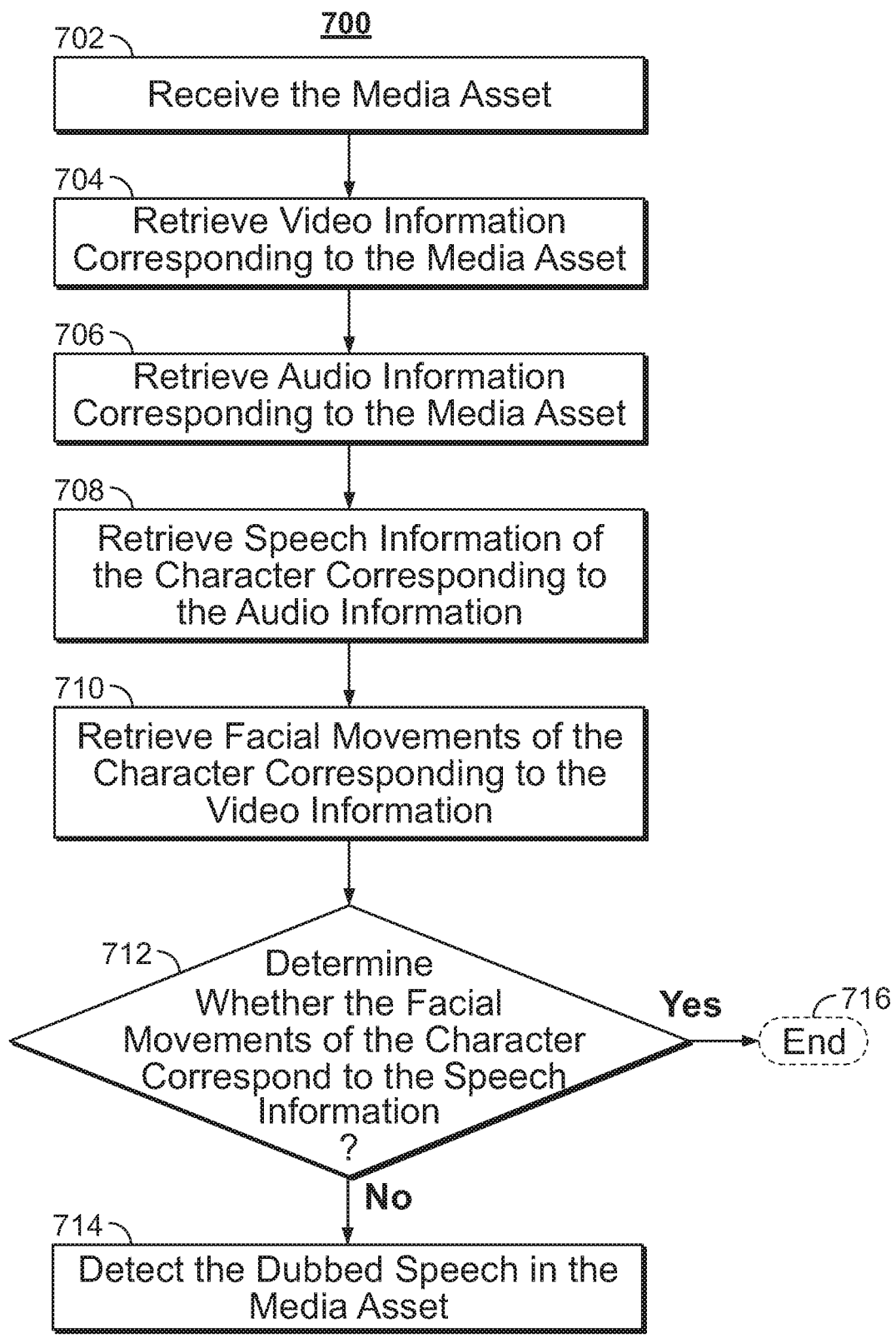
FIG. 7 depicts an illustrative flowchart of a process for detecting dubbed speech in the media asset, in accordance with some embodiments of the disclosure.

FIG. 7 depicts an illustrative flowchart of a process for detecting dubbed speech in the media asset, in accordance with some embodiments of the disclosure. Process 700 may be executed by control circuitry 404 (e.g., in a manner instructed to control circuitry 404 by the media guidance application). Control circuitry 404 may be part of a remote server separated from the user equipment by way of communications network 514.

Process 700 begins at step 702. At 702, control circuitry 404 receives the media asset. For example, control circuitry 404 receives from a server the Japanese dubbed movie "Driven."

At 704, control circuitry 404 retrieves video information corresponding to the media asset. For example, control circuitry 404 retrieves the video files corresponding to the Japanese dubbed movie "Driven."

At 706, control circuitry 404 retrieves audio information corresponding to the media asset. For example, control circuitry 404 retrieves the audio files corresponding to the Japanese dubbed movie "Driven."

At 708, control circuitry 404 retrieves speech information of the character corresponding to the audio information. For example, control circuitry 404 retrieves the part of the audio files that corresponds to Sylvester Stallone.

At 710, control circuitry 404 retrieves facial movements of the character corresponding to the video information. For example, control circuitry 404 retrieves Stallone's facial movements from the video files.

At 712, control circuitry 404 determines whether the facial movements of the character correspond to the speech information. For example, control circuitry 404 determines if what is Stallone saying corresponds to his facial movements.

If control circuitry 404 determines that the facial movements of the character do not correspond to the speech information, process 700 continues to step 714. At 714, control circuitry 404 detects the dubbed speech in the media asset. For example, if what Stallone is saying does not correspond to his facial movements, control circuitry 404 determines that the speech is dubbed.

If control circuitry 404 determines that the facial movements of the character correspond to the speech information, process 700 continues to step 716. At 716, control circuitry 404 ends.

FIG. 8 depicts an illustrative flowchart of a process for performing the function to adjust the portion of the dubbed speech so that the speech characteristic of the character featured in the first scene matches the context speech characteristic for the context of the first scene using a speech template, in accordance with some embodiments of the disclosure. Process 800 may be executed by control circuitry 404 (e.g., in a manner instructed to control circuitry 404 by the media guidance application). Control circuitry 404 may be part of a remote server separated from the user equipment by way of communications network 514.

Process 800 starts at step 802. At 802, control circuitry 404 retrieves a first set of vocal characteristics corresponding to the portion of the dubbed speech. For example, control circuitry 404 retrieves the set of vocal characteristics like pitch, pauses, rate, and rhythm corresponding to the dialog in the first scene of the Japanese dubbed movie "Driven."

At 804, control circuitry 404 identifies a speech template from the set of speech templates corresponding to the character featured in the first scene, that has a speech characteristic that matches the context speech characteristic for the context of the first scene. For example, control circuitry 404 retrieves the template in which Stallone sounds alarmed.

At 806, control circuitry 404 retrieves a second set of vocal characteristics corresponding to the speech template that has the speech characteristic that matched the context speech characteristic for the context of the first scene. For example, control circuitry 404 retrieves the set of vocal characteristics like pitch, pauses, rate, and rhythm corresponding to the template in which Stallone sounds alarmed.

At 808, control circuitry 404 identifies a first vocal characteristic from the first set of vocal characteristics that does not match a corresponding second vocal characteristic from the second set of vocal characteristics. For example, control circuitry 404 determines that the speech from the first scene has a different rhythm than the template in which Stallone sounds alarmed.

At 810, control circuitry 404 adjusts the first vocal characteristic from the first set of vocal characteristics to match the corresponding second vocal characteristic from the second set of vocal characteristics. For example, control circuitry 404 adjusts the rhythm of the speech from the first scene to be the same as the rhythm of the template in which Stallone sounds alarmed.

FIG. 9 depicts an illustrative flowchart of a process for performing the function to adjust the portion of the dubbed speech so that the speech characteristic of the character featured in the first scene matches the context speech characteristic for the context of the first scene using a second scene, in accordance with some embodiments of the disclosure. Process 900 may be executed by control circuitry 404 (e.g., in a manner instructed to control circuitry 404 by the media guidance application). Control circuitry 404 may be part of a remote server separated from the user equipment by way of communications network 514.

Process 900 starts at step 902. At 902, control circuitry 404 receives metadata corresponding to a second scene from the plurality of scenes. For example, control circuitry 404 receives metadata for a second scene from the Japanese dubbed movie "Driven."

At step 904, control circuitry 404 determines context of the second scene based on the metadata corresponding to the second scene. For example, control circuitry 404 determines that the second scene is an action scene.

At step 906, control circuitry 404 retrieves a context speech characteristic for the context of the second scene. For example, control circuitry 404 retrieves from a look-up table that the speech characteristic is alarmed.

At step 908, control circuitry 404 determines that the context speech characteristic for the context of the first scene matches the context speech characteristic for the context of the second scene. For example, control circuitry 404 determines that Stallone is supposed sound alarmed in both scenes.

At step 910, control circuitry 404 retrieves a portion of the dubbed speech corresponding to the second scene. For example, control circuitry 404 retrieves the dialog of the second scene.

At step 912, control circuitry 404 retrieves a first set of vocal characteristics corresponding to the portion of the dubbed speech corresponding to the first scene. For example, control circuitry 404 retrieves the set of vocal characteristics like pitch, pauses, rate, and rhythm corresponding to the dialog in the first scene of the Japanese dubbed movie "Driven."

At step 914, control circuitry 404 retrieves a second set of vocal characteristics corresponding to the portion of the dubbed speech corresponding to the second scene. For example, control circuitry 404 retrieves the set of vocal characteristics like pitch, pauses, rate, and rhythm corresponding to the dialog in the second scene of the Japanese dubbed movie "Driven."

At step 916, control circuitry 404 identifies a first vocal characteristic from the first set of vocal characteristics that does not match a corresponding second vocal characteristic from the second set of vocal characteristics. For example, control circuitry 404 determines that the dialog in the first scene has a different rhythm than the dialog in the second scene.

At step 918, control circuitry 404 adjusts the first vocal characteristic from the first set of vocal characteristics to match the corresponding second vocal characteristic from the second set of vocal characteristics. For example, control circuitry 404 adjusts the rhythm of the dialog in the first scene to match that of the second scene.

It should be noted that processes 600-900 or any step thereof could be performed on, or provided by, any of the devices shown in FIGS. 2-5. For example, any of processes 600-900 may be executed by control circuitry 404 (FIG. 4) as instructed by control circuitry implemented on user equipment 502, 504, 506 (FIG. 5), and/or a user equipment for selecting a recommendation. In addition, one or more steps of processes 600-900 may be incorporated into or combined with one or more steps of any other process or embodiment.

It is contemplated that the steps or descriptions of each of FIGS. 6-9 may be used with any other embodiment of this disclosure. In addition, the steps and descriptions described in relation to FIGS. 6-9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 2-5 could be used to perform one or more of the steps in FIGS. 6-9.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
   detecting dubbed speech in a media asset;
   receiving metadata corresponding to the media asset;
   determining a plurality of scenes in the media asset based on the metadata;
   determining context of a first scene from the plurality of scenes based on the metadata;
   retrieving a portion of the dubbed speech corresponding to the first scene;
   processing the retrieved portion of the dubbed speech corresponding to the first scene to identify a speech characteristic of a character featured in the first scene;
   determining whether the speech characteristic of the character featured in the first scene matches the context of the first scene; and
   in response to determining that the speech characteristic of the character featured in the first scene fails to match the context of the first scene, performing a function to adjust the portion of the dubbed speech so that the speech characteristic of the character featured in the first scene match the context of the first scene.

2. A method for detecting and correcting a mismatch between a speech characteristic of a portion of a dubbed speech of a character featured in a first scene and context of the first scene, comprising:
   detecting dubbed speech in a media asset;
   in response to detecting the dubbed speech in the media asset, receiving metadata corresponding to the media asset;
   determining a plurality of scenes in the media asset based on the metadata;
   receiving metadata corresponding to a first scene from the plurality of scenes;
   determining context of the first scene based on the metadata corresponding to the first scene;
   retrieving a context speech characteristic for the context of the first scene;
   retrieving a portion of the dubbed speech corresponding to the first scene;
   retrieving a set of speech templates corresponding to a character featured in the first scene, wherein each speech template from the set of speech templates corresponds to a different speech characteristic of the character featured in the first scene;
   comparing the retrieved portion of the dubbed speech corresponding to the first scene to each speech template from the set of speech templates corresponding to the character featured in the first scene to identify a speech template that corresponds to the retrieved portion;
   identifying a speech characteristic associated with the identified speech template;
   determining whether the identified speech characteristic of the character featured in the first scene matches the context speech characteristic for the context of the first scene; and
   in response to determining that the speech characteristic of the character featured in the first scene fails to match the context speech characteristic for the context of the first scene, performing a function to adjust the portion of the dubbed speech so that the speech characteristic of the character featured in the first scene match the context speech characteristic for the context of the first scene.

3. The method of claim 2, wherein detecting the dubbed speech in the media asset, comprises:
   receiving the media asset;
   retrieving video information corresponding to the media asset;
   retrieving audio information corresponding to the media asset;
   retrieving speech information of the character corresponding to the audio information;
   retrieving facial movements of the character corresponding to the video information;
   determining whether the facial movements of the character correspond to the speech information; and
   in response to determining that the facial movements of the character do not correspond to the speech information, detecting the dubbed speech in the media asset.

4. The method of claim 2, wherein determining the context of the first scene based on the metadata corresponding to the first scene, comprises:
   retrieving a plurality of keywords corresponding to the metadata corresponding to the first scene; and determining context of the first scene based on a subset of the plurality of the keywords corresponding to the metadata corresponding to the first scene.

5. The method of claim 2, wherein retrieving the context speech characteristic for the context of the first scene, comprises:
retrieving a personality metadata corresponding to the character, wherein the personality metadata comprises expected speech characteristic for each context for the character; and
identifying the context speech characteristic as the expected speech characteristic for the context of the first scene based on the personality metadata corresponding to the character.

6. The method of claim 2, wherein retrieving the set of speech templates corresponding to the character featured in the first scene, comprises:
retrieving a language of the dubbed speech corresponding to the media asset; and
retrieving the set of speech templates corresponding to the character featured in the first scene and corresponding to the language of the dubbed speech.

7. The method of claim 2, wherein retrieving the set of speech templates corresponding to the character featured in the first scene, comprises:
retrieving an original speech corresponding to the media asset; and
retrieving a portion of the original speech corresponding to the first scene; and
retrieving the set of speech templates corresponding to the character featured in the first scene based on the retrieved portion of the original speech corresponding to the first scene.

8. The method of claim 2, wherein comparing the retrieved portion of the dubbed speech corresponding to the first scene to each speech template from the set of speech templates corresponding to the character featured in the first scene, comprises:
retrieving a first set of vocal characteristics corresponding to the retrieved portion;
retrieving a second set of vocal characteristics corresponding to a speech template from the set of speech templates corresponding to the character featured in the first scene; and
comparing a first vocal characteristic from the first set of vocal characteristics to a corresponding second vocal characteristic from the second set of vocal characteristics.

9. The method of claim 2, wherein performing the function to adjust the portion of the dubbed speech so that the speech characteristic of the character featured in the first scene match the context speech characteristic for the context of the first scene, comprises:
retrieving a first set of vocal characteristics corresponding to the portion of the dubbed speech;
identifying a speech template from the set of speech templates corresponding to the character featured in the first scene, that has a speech characteristic that matches the context speech characteristic for the context of the first scene;
retrieving a second set of vocal characteristics corresponding to the speech template that has the speech characteristic that matched the context speech characteristic for the context of the first scene;
identifying a first vocal characteristic from the first set of vocal characteristics that does not match a corresponding second vocal characteristic from the second set of vocal characteristics; and
adjusting the first vocal characteristic from the first set of vocal characteristics to match the corresponding second vocal characteristic from the second set of vocal characteristics.

10. The method of claim 2, wherein performing the function to adjust the portion of the dubbed speech so that the speech characteristic of the character featured in the first scene match the context speech characteristic for the context of the first scene, comprises:
receiving metadata corresponding to a second scene from the plurality of scenes;
determining context of the second scene based on the metadata corresponding to the second scene;
retrieving a context speech characteristic for the context of the second scene;
determining that the context speech characteristic for the context of the first scene matches the context speech characteristic for the context of the second scene;
retrieving a portion of the dubbed speech corresponding to the second scene;
retrieving a first set of vocal characteristics corresponding to the portion of the dubbed speech corresponding to the first scene;
retrieving a second set of vocal characteristics corresponding to the portion of the dubbed speech corresponding to the second scene;
identifying a first vocal characteristic from the first set of vocal characteristics that does not match a corresponding second vocal characteristic from the second set of vocal characteristics; and
adjusting the first vocal characteristic from the first set of vocal characteristics to match the corresponding second vocal characteristic from the second set of vocal characteristics.

11. The method of claim 10, further comprising:
retrieving a portion of an adjusted dubbed speech corresponding to the first scene;
comparing the retrieved portion of the adjusted dubbed speech corresponding to the first scene to each speech template from the set of speech templates corresponding to the character featured in the first scene to identify a speech template that corresponds to the retrieved portion of the adjusted dubbed speech;
identifying a speech characteristic associated with the identified speech template that corresponds to the retrieved portion of the adjusted dubbed speech; and
determining that the identified speech characteristic of the character featured in the first scene that corresponds to the retrieved portion of the adjusted dubbed speech matches the context speech characteristic for the context of the first scene.

12. A system for detecting and correcting a mismatch between a speech characteristic of a portion of a dubbed speech of a character featured in a first scene and context of the first scene, the system comprising:
control circuitry configured to:
detect dubbed speech in a media asset;
in response to detecting the dubbed speech in the media asset, receive metadata corresponding to the media asset;
determine a plurality of scenes in the media asset based on the metadata;

receive metadata corresponding to a first scene from the plurality of scenes;

determine context of the first scene based on the metadata corresponding to the first scene;

retrieve a context speech characteristic for the context of the first scene;

retrieve a portion of the dubbed speech corresponding to the first scene;

retrieve a set of speech templates corresponding to a character featured in the first scene, wherein each speech template from the set of speech templates corresponds to a different speech characteristic of the character featured in the first scene;

compare the retrieved portion of the dubbed speech corresponding to the first scene to each speech template from the set of speech templates corresponding to the character featured in the first scene to identify a speech template that corresponds to the retrieved portion;

identify a speech characteristic associated with the identified speech template;

determine whether the identified speech characteristic of the character featured in the first scene matches the context speech characteristic for the context of the first scene; and in response to determining that the speech characteristic of the character featured in the first scene fails to match the context speech characteristic for the context of the first scene, perform a function to adjust the portion of the dubbed speech so that the speech characteristic of the character featured in the first scene match the context speech characteristic for the context of the first scene.

13. The system of claim 12, wherein the control circuitry is further configured, when detecting the dubbed speech in the media asset, to:

receive the media asset;

retrieve video information corresponding to the media asset;

retrieve audio information corresponding to the media asset;

retrieve speech information of the character corresponding to the audio information;

retrieve facial movements of the character corresponding to the video information;

determine whether the facial movements of the character correspond to the speech information; and in response to determining that the facial movements of the character do not correspond to the speech information, detect the dubbed speech in the media asset.

14. The system of claim 12, wherein the control circuitry is further configured, when determining the context of the first scene based on the metadata corresponding to the first scene, to:

retrieve a plurality of keywords corresponding to the metadata corresponding to the first scene; and determine context of the first scene based on a subset of the plurality of the keywords corresponding to the metadata corresponding to the first scene.

15. The system of claim 12, wherein the control circuitry is further configured, when retrieving the context speech characteristic for the context of the first scene, to:

retrieve a personality metadata corresponding to the character, wherein the personality metadata comprises expected speech characteristic for each context for the character; and identify the context speech characteristic as the expected speech characteristic for the context of the first scene based on the personality metadata corresponding to the character.

16. The system of claim 12, wherein the control circuitry is further configured, when retrieving the set of speech templates corresponding to the character featured in the first scene, to:

retrieve a language of the dubbed speech corresponding to the media asset; and retrieve the set of speech templates corresponding to the character featured in the first scene and corresponding to the language of the dubbed speech.

17. The system of claim 12, wherein the control circuitry is further configured, when retrieving the set of speech templates corresponding to the character featured in the first scene, to:

retrieve an original speech corresponding to the media asset; and retrieve a portion of the original speech corresponding to the first scene; and retrieve the set of speech templates corresponding to the character featured in the first scene based on the retrieved portion of the original speech corresponding to the first scene.

18. The system of claim 12, wherein the control circuitry is further configured, when comparing the retrieved portion of the dubbed speech corresponding to the first scene to each speech template from the set of speech templates corresponding to the character featured in the first scene, to:

retrieve a first set of vocal characteristics corresponding to the retrieved portion;

retrieve a second set of vocal characteristics corresponding to a speech template from the set of speech templates corresponding to the character featured in the first scene; and compare a first vocal characteristic from the first set of vocal characteristics to a corresponding second vocal characteristic from the second set of vocal characteristics.

19. The system of claim 12, wherein the control circuitry is further configured, when performing the function to adjust the portion of the dubbed speech so that the speech characteristic of the character featured in the first scene match the context speech characteristic for the context of the first scene, to:

retrieve a first set of vocal characteristics corresponding to the portion of the dubbed speech;

identify a speech template from the set of speech templates corresponding to the character featured in the first scene, that has a speech characteristic that matches the context speech characteristic for the context of the first scene;

retrieve a second set of vocal characteristics corresponding to the speech template that has the speech characteristic that matched the context speech characteristic for the context of the first scene;

identify a first vocal characteristic from the first set of vocal characteristics that does not match a corresponding second vocal characteristic from the second set of vocal characteristics; and adjust the first vocal characteristic from the first set of vocal characteristics to match the corresponding second vocal characteristic from the second set of vocal characteristics.

20. The system of claim 12, the control circuitry is further configured, when performing the function to adjust the portion of the dubbed speech so that the speech characteristic of the character featured in the first scene match the context speech characteristic for the context of the first scene, to:
- receive metadata corresponding to a second scene from the plurality of scenes;
- determine context of the second scene based on the metadata corresponding to the second scene;
- retrieve a context speech characteristic for the context of the second scene;
- determine that the context speech characteristic for the context of the first scene matches the context speech characteristic for the context of the second scene;
- retrieve a portion of the dubbed speech corresponding to the second scene;
- retrieve a first set of vocal characteristics corresponding to the portion of the dubbed speech corresponding to the first scene;
- retrieve a second set of vocal characteristics corresponding to the portion of the dubbed speech corresponding to the second scene;
- identify a first vocal characteristic from the first set of vocal characteristics that does not match a corresponding second vocal characteristic from the second set of vocal characteristics; and
- adjust the first vocal characteristic from the first set of vocal characteristics to match the corresponding second vocal characteristic from the second set of vocal characteristics.

21. The system of claim 20, the control circuitry is further configured to:
- retrieve a portion of an adjusted dubbed speech corresponding to the first scene;
- compare the retrieved portion of the adjusted dubbed speech corresponding to the first scene to each speech template from the set of speech templates corresponding to the character featured in the first scene to identify a speech template that corresponds to the retrieved portion of the adjusted dubbed speech;
- identify a speech characteristic associated with the identified speech template that corresponds to the retrieved portion of the adjusted dubbed speech; and
- determine that the identified speech characteristic of the character featured in the first scene that corresponds to the retrieved portion of the adjusted dubbed speech matches the context speech characteristic for the context of the first scene.

* * * * *